Patented July 16, 1940

2,207,725

UNITED STATES PATENT OFFICE 2,207,725

REMOVAL OF FLUORIDES FROM DRINKING WATER

Elias Elvove, Washington, D. C., assignor to the Government of the United States of America, as represented by the Secretary of the Treasury No Drawing. Application February 12, 1937, Serial No. 125,481

4 Claims. (Cl. 210—23)

(Granted under the act of March 3, 1883, as amended April 30, 1928; 370 O. G. 757)

The invention described herein, if patented, may be used by or for the Government of the United States for governmental purposes without the payment to me of any royalty thereon.

The present invention relates to a method for removing fluorides from drinking waters. It has been found that the dental hypoplasia, now referred to as chronic dental fluorosis, and also known as "mottled enamel" of the human teeth, is caused or associated with the presence of toxic quantities of fluoride in the drinking water used by children during the period of tooth development. According to our present knowledge, the teeth become affected when the concentration of fluoride, calculated as fluorine (F), is in excess of about 1 part per million in the drinking water; and within the range of the fluoride concentrations ordinarily met with in drinking waters, the degree of severity of the mottled enamel and the incidence increase with increases in the fluoride concentration.

I have found that fluorides can be removed from drinking water with the aid of magnesium oxide (MgO) or magnesium hydroxide, $Mg(OH)_2$, especially when employed in comparatively large excess in comparison with the quantity of fluoride to be removed, as illustrated below by a specific example.

Since one of the aims is to enable an individual family to treat its own water, I shall describe an adaptation of my method wherein only simple apparatus, which can be readily and cheaply obtained, and a technique which does not require special skill in the art of purifying waters, are utilized. At the same time, however, it will illustrate the basic principles of the method, which will enable one versed in the art to utilize it under different conditions.

Under circumstances where one does not have electric or other motive power readily available, one can carry out my method in ordinary bottles and utilize the magnesium oxide as it is obtainable commercially in a powdered condition. Under such circumstances and assuming that the water contains about 5 parts per million of fluoride (F), is relatively low in mineral content and has a pH of approximately near neutrality, one may proceed as follows:

Into a bottle of about 2½-gallon capacity, place 2 gallons of the water to be treated, and ¼ pound of magnesium oxide in finely powdered condition and shake well for about half an hour (or for several shorter periods until the total amounts to about half an hour). Allow to settle and filter through a suitable filter.

It is, of course, to be expected that since natural waters vary greatly in chemical composition, and fluoride-containing waters vary also in their fluoride concentrations, that some of the details of the method, such as the excess of the magnesium oxide to use, the time of agitation and mixing, the fineness or state of division of the powder or precipitate, the time to allow for the settling, etc., will have to be adjusted experimentally on the basis of the chemical composition of the water to be treated and its fluoride concentration.

In the specific case mentioned, experience has shown that a 48-hour settling has often been sufficient to render the upper ¾ of the water practically clear even without filtering. Since, however, it is quite simple, even when operating on a comparatively small scale, to utilize a siphon-action for drawing off the water treated, after the solids have settled, and to connect the lower end of the siphon tube with a suitable filter, it is preferable to follow such a procedure and pass the treated water through a suitable filter.

It is apparent that instead of adding the magnesium oxide as an extraneously-formed preparation which on agitation with the water becomes hydrated, forming magnesium hydroxide, $Mg(OH)_2$, one can produce this compound directly in the water to be treated by adding appropriate chemicals which will react to produce it and, in some cases, by also utilizing the magnesium present in the water to be treated. In general, however, it appears preferable to add the magnesium oxide or hydroxide as an extraneously-formed preparation, since it thus becomes easier to apply this method even by one who is not versed in the chemical reactions involved and also avoids the possibilities of error in the dosages of the chemicals to be added.

Furthermore, the use of magnesium oxide has some advantages over the use of magnesium hydroxide. Among these advantages may be mentioned that the magnesium oxide occupies less volume, is more readily available, and costs less.

In the specific case mentioned, the charge of ¼ pound of magnesium oxide could be used over again several times for treating additional lots of the water. As may be expected, however, the number of times a given charge could be used over, before its activity as a fluoride remover becomes exhausted, will depend largely on the fluoride concentration of the water and on the nature of its other constituents. By utilizing the relatively simple (colorimetric) zirconiumalizarin reagent for fluorides (Public Health Reports, vol. 48, pp. 1219–1222), one can follow the degree of fluoride removal and know when a new charge will be required or when to reactivate the old charge.

I claim:

1. A method for the removal from drinking water of fluorides dissolved in the water consisting in contacting such fluoride containing drinking water with a substance from the group consisting of finely divided magnesium oxide and magnesium hydroxide in an amount of at least 100 parts per one part of fluoride contained in said water, maintaining said contact for a period sufficient to reduce substantially the dissolved fluoride content of the water, and separating the water from the insoluble solids.

2. A method for the removal from drinking water of fluorides dissolved in the water in concentrations even less than that corresponding to the solubility of calcium fluoride in water, and without substantially increasing its saline content, consisting in placing such fluoride containing drinking water in intimate contact with a substance from the group consisting of finely divided substantially fluoride free magnesium oxide and substantially fluoride-free magnesium hydroxide, in large, separable, excess comprising by weight hundreds of times the fluoride content of the water, for a time sufficiently long to remove a substantial proportion of the dissolved fluoride, and separating the water from the insolubles.

3. A method for the removal from drinking water of fluorides dissolved in the water in concentrations even less than that corresponding to the solubility of calcium fluoride in water, and without substantially increasing its saline content, consisting in agitating such fluoride containing drinking water with a substance from the group consisting of finely divided substantially fluorine-free magnesium oxide and substantially fluorine-free magnesium hydroxide, in large, separable, excess comprising by weight hundreds of times the fluoride content of the water, for a time sufficiently long to remove a substantial proportion of the dissolved fluoride, and separating the water from the insolubles.

4. A method for the removal from drinking water of fluorides dissolved in the water in concentrations even less than that corresponding to the solubility of calcium fluoride in water, and without substantially increasing its saline content, consisting in agitating such fluoride containing drinking water with a substance from the group consisting of finely divided substantially fluorine-free magnesium oxide and substantially fluorine-free magnesium hydroxide, in large, separable, excess comprising by weight hundreds of times the fluoride content of the water, for a time sufficiently long to remove a substantial proportion of the dissolved fluoride, allowing the solids to settle, drawing off the treated water, and repeating the process until the fluoride-removing power of the substance has been exhausted.

ELIAS ELVOVE.